United States Patent
Lozben et al.

(10) Patent No.: US 8,171,430 B1
(45) Date of Patent: May 1, 2012

(54) SYSTEM AND METHOD FOR PROVIDING AN IMAGE AND IMAGE INSTRUCTIONS RESPONSIVE TO A MOUSE CURSOR POSITION

(75) Inventors: Slavik Lozben, San Francisco, CA (US); Gary Grossman, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2481 days.

(21) Appl. No.: 10/201,729

(22) Filed: Jul. 23, 2002

Related U.S. Application Data

(60) Provisional application No. 60/307,724, filed on Jul. 24, 2001.

(51) Int. Cl.
*G06F 3/00* (2006.01)

(52) U.S. Cl. ........ 715/861; 715/856; 715/719; 715/716; 715/765; 345/473

(58) Field of Classification Search .................. 715/733, 715/764, 765, 856, 861, 866, 977, 716, 719, 715/501.1, 205; 345/473
See application file for complete search history.

(56) References Cited

U.S. PATENT DOCUMENTS

| | | | | |
|---|---|---|---|---|
| 5,546,521 A * | 8/1996 | Martinez | ........................ | 715/711 |
| 5,621,875 A * | 4/1997 | Mason et al. | .................. | 715/531 |
| 5,801,692 A * | 9/1998 | Muzio et al. | ................... | 715/764 |
| 5,801,698 A * | 9/1998 | Lection et al. | ................. | 715/861 |
| 5,809,512 A * | 9/1998 | Kato | ............................... | 715/502 |
| 5,898,432 A * | 4/1999 | Pinard | ............................ | 715/861 |
| 5,918,237 A * | 6/1999 | Montalbano | .................... | 715/513 |
| 5,995,101 A * | 11/1999 | Clark et al. | .................... | 715/711 |
| 6,065,057 A * | 5/2000 | Rosen et al. | ................... | 709/229 |
| 6,100,871 A * | 8/2000 | Min | ................................ | 715/861 |
| 6,137,472 A * | 10/2000 | Pekelney et al. | .............. | 715/858 |
| 6,204,828 B1 * | 3/2001 | Amir et al. | ......................... | 345/7 |
| 6,278,455 B1 * | 8/2001 | Baker | ............................ | 715/716 |
| 6,313,836 B1 * | 11/2001 | Russell et al. | ................. | 345/419 |
| 6,331,861 B1 * | 12/2001 | Gever et al. | .................... | 345/629 |
| 6,381,519 B1 * | 4/2002 | Snyder | .............................. | 701/3 |
| 6,903,723 B1 * | 6/2005 | Forest | ............................ | 345/157 |
| 6,981,229 B1 * | 12/2005 | Balakrishnan et al. | ......... | 715/863 |
| 2002/0033844 A1 * | 3/2002 | Levy et al. | ...................... | 345/744 |
| 2002/0075230 A1 * | 6/2002 | Okuda et al. | ................... | 345/157 |
| 2002/0109736 A1 * | 8/2002 | Chailleux | ....................... | 345/856 |
| 2002/0130838 A1 * | 9/2002 | Feierbach | ....................... | 345/157 |
| 2002/0163545 A1 * | 11/2002 | Hii | .................................. | 345/838 |
| 2003/0001906 A1 * | 1/2003 | Light et al. | ..................... | 345/849 |
| 2004/0210852 A1 * | 10/2004 | Balakrishnan et al. | | |
| 2004/0237053 A1 * | 11/2004 | Impas et al. | .................... | 715/856 |
| 2005/0183017 A1 * | 8/2005 | Cain | ............................... | 715/719 |

OTHER PUBLICATIONS

Toshiyuki Masui et al, "Elastic Graphical Interfaces for Precise Data Manipulation", Apr. 1995, ACM press, ACM Conference on Human Factors in Computing Systems, p. 143-144.*

* cited by examiner

*Primary Examiner* — Xiomar L Bautista
(74) *Attorney, Agent, or Firm* — Fish & Richardson P.C.

(57) ABSTRACT

A system and method receives an image or animation, which may be vector based to allow for scalability or antialiased or both, and replaces or supplements a mouse cursor with the image or animation. Attributes such as position or size of the image or animation may be altered according to instructions supplied by an author or programmer and signals received from a pointing device, allowing, for example, the mouse cursor to be replaced with the image or animation.

24 Claims, 4 Drawing Sheets

SYSTEM AND METHOD FOR PROVIDING AN IMAGE AND IMAGE INSTRUCTIONS RESPONSIVE TO A MOUSE CURSOR POSITION

RELATED APPLICATION

This application claims the benefit of U.S. provisional patent application Ser. No. 60/307,724 entitled "Method And Apparatus For Providing An Image And Image Instructions Responsive To A Mouse Cursor Position" filed on Jul. 24, 2001 by Slavik Lozben and Gary Grossman and is hereby incorporated by reference in its entirety.

ATTORNEY DOCKET NUMBER

1329

EXPRESS MAIL LABEL NUMBER

EV062202688US

INVENTORS

Slavik Lozben
Gary Grossman

FIELD OF THE INVENTION

The present invention is related to computer software and more specifically to computer software for image display.

BACKGROUND OF THE INVENTION

Many application programs utilize one or more cursors to indicate insertion or selection points. One type of cursor is a mouse cursor. Mouse cursors are used in windows environments to indicate the location of the mouse with respect to one or more windows. The user moves a mouse over a surface to cause the mouse cursor to move. The mouse cursor may be used in a variety of ways. For example, if the user positions the mouse cursor over an object and then clicks it, the object may be selected.

The conventional Windows operating system uses bitmapped mouse cursors, and allows an application program to provide the bitmap that will be used as the mouse cursor, and change it at any time. The program can thus change the mouse cursor to allow it to be used as an indicator. For example, while a program is performing calculations, the program can change the mouse cursor to an hourglass by supplying an identifier of a file containing an hourglass bitmap to indicate to the user that the program is busy.

The use of bitmaps for mouse cursors have several drawbacks. One drawback of the use of a bitmap for a mouse cursor is that bitmaps don't scale well. Although one can scale a bitmap up or down, scaling a bitmap up causes the image to appear pixelated, and scaling a bitmap down can cause image detail to be lost. If the user wishes to use a mouse cursor that changes in size, the user must supply several bitmaps at different sizes, which can cause the mouse cursor to appear to jump from one size to another rather than smoothly change size, or the user can scale the bitmaps, resulting in the pixelated larger image and a smaller image that is rendered with missing detail. Although capabilities such as interpolation/antialiasing could be used to scale the bitmap, the operating system may not perform such a function.

Another drawback to the use of bitmaps is that bitmaps are static images. A programmer of an application cannot supply an animated sequence to the operating system for display as a mouse cursor. Although the programmer of the application could direct the operating system to replace the mouse cursor with one bitmap, and then replace it with another and another in order to simulate an animation, this can dramatically add to the complexity of the application program. Furthermore, because operating system may not have been designed with this capability in mind, it may not be able to process the successive replacements quickly enough and without interruption of the image to produce a truly pleasing animated effect.

The lack of a scalable, antialiased mouse cursor and the lack of an animated mouse cursor can be particularly noticeable if the application program for which the mouse cursor is being used contains these capabilities. For example, web applications that are displayed using the conventional Flash Player commercially available from Macromedia, Inc. of San Francisco, Calif., allows a user to view animated sequences that have the potential to be antialiased as they scale up or down. The mouse cursor may be used to operate the application, yet its display as a static bitmap restricts the application from incorporating the mouse cursor as an integral part of the application. Thus, the mouse cursor appears too distantly related to the application.

What is needed is a system and method for providing a scalable, antialiased or animated mouse cursor, for use by applications such as those displaying scalable, antialiased or animated images.

SUMMARY OF INVENTION

An author provides, and a system and method receives, an optional instruction to hide the bitmapped mouse cursor and receives one or more instructions to display as an alternate cursor an image or animation in a manner that depends on the location of the hidden or not hidden mouse cursor. The instructions may be compiled or otherwise transformed, such as by compiling the instructions into a Flash movie and uploaded and stored on a server. The system and method receives the instructions, which may be compiled or transformed, and provides information to hide a mouse cursor and display an alternate cursor, which may include an image or series of images to be displayed as an animation according to a location corresponding to the optionally hidden mouse cursor. Attributes, such as position or size or both, of the alternate cursor may change according to the instructions and signals from the mouse. Each image may be vector based, antialiased or both to allow it to scale.

DETAILED DESCRIPTION OF A PREFERRED EMBODIMENT

Figure 1:
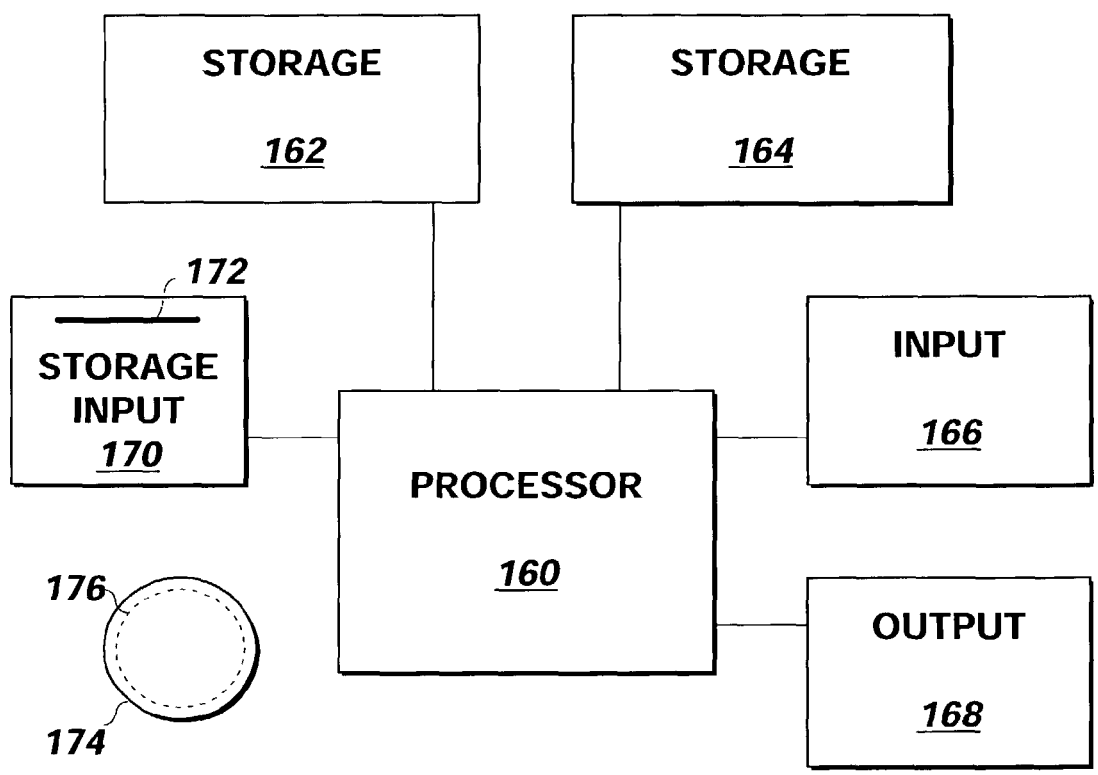
FIG. 1 is a block schematic diagram of a conventional computer system.
Figure 2:
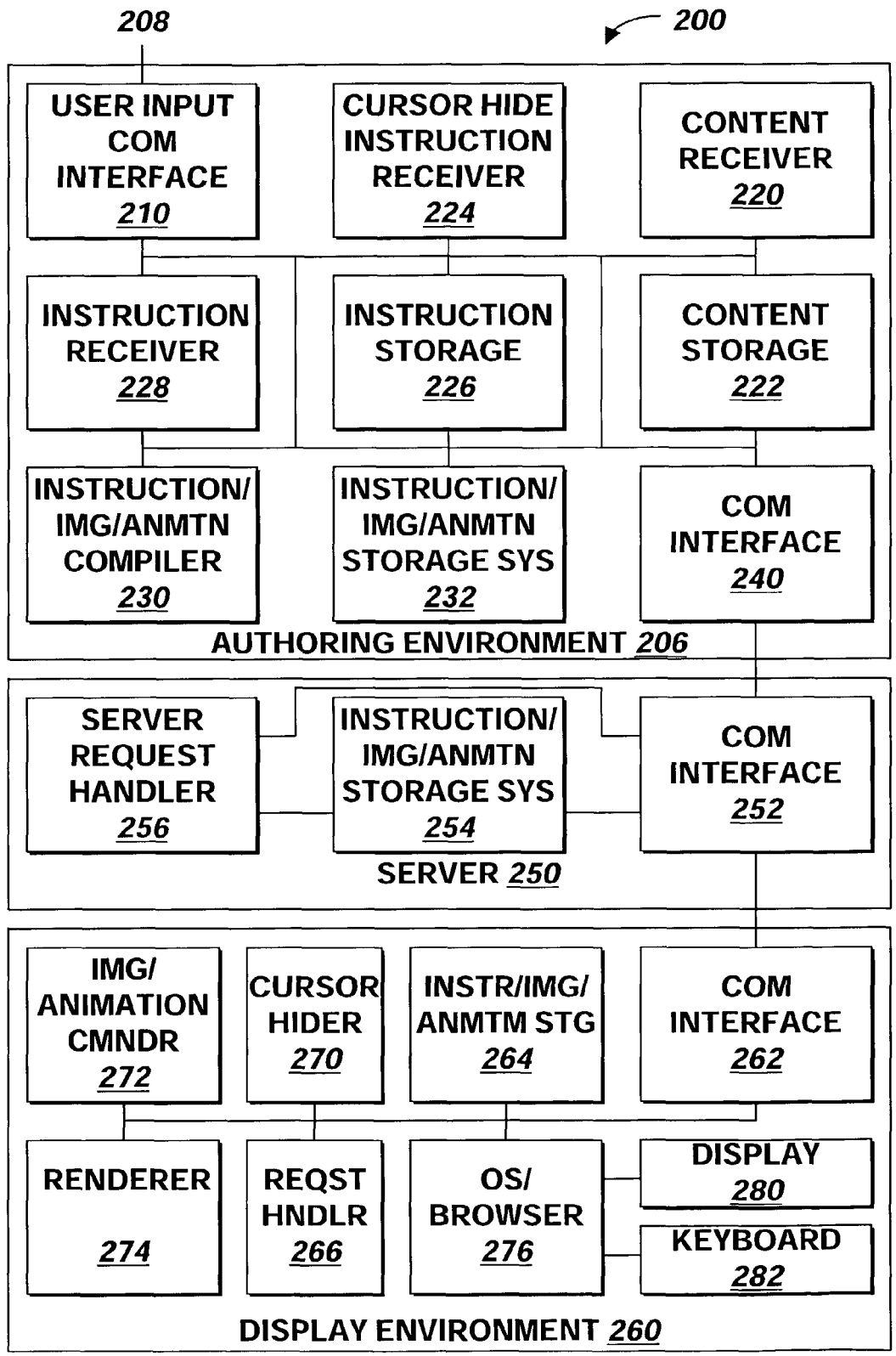
FIG. 2 is a block schematic diagram of a system for receiving, compiling, storing and executing instructions to display an alternate cursor corresponding to one or more locations of a mouse cursor according to one embodiment of the present invention.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or a Macintosh computer system running the MacOS, OS X or OpenStep operating system commercially available from Apple Computer Corporation of Cupertino, Calif. and the Netscape browser commercially available from Netscape Computer Corporation of Mountain View, Calif. although other systems may be used.

Computer users may interact with screen content that contains text and graphics and other media, such as web pages or multimedia presentations. To enhance the viewing experience, the screen content may contain images and animations using any conventional graphics or web authoring tool. In one embodiment, the screen content includes a Flash movie clip, developed using the conventional Flash authoring tool commercially available from Macromedia, Inc., of San Francisco, Calif. and rendered to the user using the conventional Flash Player, also available from Macromedia as a plug in to conventional browser products such as Internet Explorer or Netscape Navigator. Briefly, a Flash movie can be defined using instructions, images and sounds, compiled and uploaded to a server. When a user requests the movie using a browser, the movie is downloaded and rendered by the player as a series of frames containing vector based graphics images. Flash is described in more detail in Ulrich, "Flash 5 for Windows and Macintosh" (2001, Peachpit Press, Berkeley, Calif., ISBN 0-201-71614-3) which is hereby incorporated by reference in its entirety.

As described below, the author of the Flash movie or programmer of an application may enhance the screen content by providing instructions that can have the effect of replacing or supplementing the conventional bitmap mouse cursor with an alternate cursor containing animation or vector based graphics image, referred to below as an image/animation cursor.

During operation of the application or playback of the movie containing such instructions, if the image/animation cursor includes an animation, the animation may continue to play, whether the cursor is stationary or in motion. The instructions may direct the application or movie player to change attributes of the image/animation cursor in response to signals received from a mouse or other conventional pointing device such as a trackball, touchpad, joystick, arrow keys on a keypad or other device that would otherwise be used by the user to change the position of the mouse cursor. This can allow, for example, the image/animation cursor to appear as if it had replaced the conventional mouse cursor. The image/animation cursor can thus be more tightly integrated with the screen content of the application or movie in which the mouse cursor is displayed. For example, the image/animation cursor can be an image or animation representing the hero in a game application or movie, and replacing the position of the conventional mouse cursor so that the user can move the image or animation of the hero using the mouse or other pointing device.

The system and method of the present invention will be described with reference to the Flash authoring tool and Flash Player plug in described above. However, the system and method of the present invention could be used by any image or web authoring tool or any other application, with the author replaced by a programmer.

An author uses authoring environment 206 to create content, instructions, the image or animation that includes the image/animation cursor and instructions for the image/animation cursor. The content includes any form of information, such as screen content including images, animation, text, video or other visual content, as well as other forms of sensory information such as audio, and includes an image/animation cursor as described below. The instructions may relate to the screen content or the image/animation cursor or the conventional cursor, and may include one or more optional instructions to hide the cursor. The image/animation cursor, like the screen content, may include instructions, images or animations. Authoring environment 206 packages the content, possibly compiling, translating and/or compressing it, for transmission to server 250.

Server 250 receives, stores and provides these instructions, images, and animations to display environment 260, as will be described in more detail below. In one embodiment, display environment 260 includes a computer running a web browser, such a Netscape Communicator v6.0 or Microsoft Internet Explorer v5.0, with the Flash Player plugged into the browser. Display environment 260 provides the content and image/animation cursor to the user according to the instructions. The user sees the image/animation cursor alter its attributes such as position or size in response to the user's actions with respect to a pointing device.

An author interacts with authoring environment 206 through user input communication interface 210, which receives input 208 from the author's local computer via mouse, keyboard, diskette, LAN or similar input device.

Authoring environment 206 receives content and instructions via communications interface 210. Content includes images, animations, audio or any other form of content that can be perceived by a user. Content may include images used for screen content and image/animation cursors and audio. To supply content, the author signals content receiver 220 and provides predefined content, such as JPEG or GIF files, WAV or MP3 files or other similar files, or the author defines content using content receiver 220, which may include a conventional graphics program such as the conventional Generator program commercially available from Macromedia of San Francisco, Calif. Content receiver 220 receives an existing file or defines the content as a new file using a graphical user interface to allow an author to define the content, for example using a palette of tools, shapes and colors in a manner similar to that of the conventional Generator program, and stores the file or files in content storage 222.

An author may then provide instructions. Instructions describe how the content is to be presented at runtime as described below. The instructions may describe when, where, and at what size the content is to be provided. In one embodiment the instructions describe the content of a sequence of frames, that will be played to a user at runtime like frames of a film to provide an animated effect when the frames are played back at 12 frames per second or another rate. The author provides instructions to instruction receiver 228 using user input communication interface 210 and instruction receiver 228 stores the instructions into instruction storage 226. In one embodiment, frames are defined by describing the content stored in content storage 222 that is to be inserted into the frame. In one embodiment, the frames are each made of individual layers to be rendered into a single layer during a compilation process. An author uses a graphical user interface to indicate the content that is to appear on each layer and at what time the content should appear. The instructions describing the layers and ordered frames define a movie clip, and the author may provide instructions via instruction receiver 228 to define a movie containing one or more movie clips. In one embodiment, the author provides instructions via instruction receiver 228 to indicate that one or more movie clips are to be combined to form a movie and to indicate the time that the movie clip should be played. For example, a first movie clip may show a dog chasing a cat and a second movie clip may show the cat running up a tree with the dog barking at the cat from the base of the tree. The author may provide instructions indicating that a movie is made from these two clips and that the second clip should be played immediately after the first. In one embodiment, movie clips may be nested to allow a movie clip to contain one or more movie clips.

In one embodiment, either before or after defining the screen content, the author provides instructions to instruction receiver 228 that will either supplement or replace the mouse cursor with a vector based static image or an animation during playback time. In one embodiment, instruction receiver includes portions of the conventional Flash 5 web authoring product commercially available from Macromedia, Inc. of San Francisco, Calif. The instructions may determine under what circumstances or during what times the cursor will be supplemented or replaced with an image/animation cursor and the attributes, such as size and position, that will be used to display the mouse cursor during playback.

For example, the author may provide instructions defining four clips and defining a movie containing 50 frames as containing 4 movie clips to be played as follows: clip 1 is to be played from frames 1-20, and clip 2 is to be played from frames 21-40, clip 3 is to be played from frames 30-50. The author may provide instructions that from frames 10-50, the conventional mouse cursor is to be hidden and that the fourth movie clip is to be played at the location that the mouse cursor would have been displayed at a size of 15 pixels high and 10 pixels wide, but at frames 40-50, the cursor is to be scaled to 30 pixels high and 20 pixels wide and antialiased. During the playback of the movie described below, the user will see the fourth clip appear as if it were the mouse cursor beginning at frame 10 and continuing until frame 50, although at frames 40-50, the cursor will be scaled to double the size and displayed in a high quality fashion resulting from the antialiasing. During the playback of frames 10-50, if the user moves the mouse or other pointing device, the movie will move in the same manner as a conventional mouse cursor.

To change cursors during playback, the author provides instructions to hide the conventional cursor, then display the image/animation cursor, as follows. The author issues an instruction to hide the conventional cursor through user input communication interface 210. User input communication interface 210 transmits the cursor hide instruction to cursor hide instruction receiver 224. Cursor hide instruction receiver 224 receives the cursor hide instruction and stores it in instruction storage 226. In one embodiment, a cursor hide instruction in Flash 5 is communicated using "Mouse.hide( );"

The author then provides instructions to display a movie clip as an image/animation cursor. The movie clip may be any conventional Flash 5 movie clip produced using the conventional Flash 5 authoring tool, and may be a static image or an animation produced using several images or a single image displayed in a sequence of different locations. As used herein an "image/animation cursor" is a vector-based image or a vector or other form of animation that is displayed differently in response to the user moving a mouse or other pointing device.

The author then specifies the attributes of the movie clip to cause it to be played back as an image/animation cursor, which means that attributes of the movie clip used as the image/animation cursor will change as the user moves the mouse or other pointing device.

In order to understand how to provide instructions to display a movie clip as an image/animation cursor, it can be helpful to understand how mouse movements are communicated to the playing movie and how instructions in that movie clip are used to change attributes of the movie clip used as the image/animation cursor, and this will now be described. During playback, as a user interacts with the movie, he or she may initiate actions such as moving the mouse or pressing down on or releasing the mouse buttons. During playback, when these events occur, control of the program is transferred to certain predefined methods of each currently running movie clip. In the conventional Flash 5 product, a predefined method for handling the event that a mouse has moved is named "Onclipevent(mousemove)". The predefined method for handling the event that a mouse button has been pressed or released is "Onclipevent(mouseup)" or "Onclipevent(mousedown)", respectively. At any given time, the last updated position of the mouse cursor is available for use in two variables. In the conventional Flash 5 authoring product, these variables are "_root._xmouse" and _root._ymouse" and describe the number of pixels from the upper left hand corner of the window in which the movie is running that the operating system of the player last reported to the flash player as the position of the mouse.

The author of the movie writes instructions into one of the event handlers described above that tell the player to change at least one attribute of the movie clip being used as the image/animation cursor and to update the image.

For example, if the author wishes the animation/image cursor to be displayed so that it is centered on the mouse cursor position, the author would use user input communication interface 210 to send instructions to instruction receiver 228 that change one or more attributes of the movie clip being used as the image animation cursor. For example, if the movie clip "MCl" has been authored at the size desired, the author provides to instruction receiver 228 the following instructions as part of the code for the movie clip to cause the movie clip to be displayed at the location of the mouse cursor when the user repositions the mouse or other pointing device:

Onclipevent(mousemove){ (Line 1)
this._x=_root._xmouse; (Line 2)
this._y=_root._ymouse; (Line 3)
UpdateAfterEvent( ); (Line 4)
} (Line 5)

Line 1 defines the instructions after the "{" and before the "}" on line 5 as instructions to be executed when the mouse is moved. Lines 2 and 3 instruct the player to set the location of an author-defined (e.g. using instruction receiver 228) center of the movie clip at the position of the mouse cursor, though other positioning may be employed. Line 4 instructs the player to redraw the screen to show the movie clip at its new location.

Image/animation position instruction receiver 228 receives these instructions and writes them to instruction storage 226.

It isn't necessary to display the movie clip used as the image/animation cursor at the location of the mouse cursor or use only one image/animation cursor, as any number of images or animations such as movie clips may be used as image/animation cursor at any location. For example, one image animation cursor could be a movie clip of a man walking displayed at the position of the mouse and another image animation cursor could be an image/animation of a cloud that hovers over the man. A movie clip of the man walking may be displayed at the location of the pointing device using lines 1-5 as described above and the cloud may be displayed hovering above the man also as described above, except that line 3 would be replaced for the cloud movie clip with this._y=_root._ymouse−10; (Line 3A)

An author may supply instructions to instruction receiver 228 to alter any attribute of a vector based image or an animation based on the location of the mouse cursor to cause an image or animation to become an image/animation cursor. For example, an author could provide instructions to instruction receiver 228 directing that the cloud be scaled in size to become twice the size of the cloud in the lower ⅓ of the screen and antialiased if the user moves the pointing device to the upper ⅔ of the screen, with the opposite effect occurring if the user moves back to the lower ⅓ of the screen. An author could provide instructions directing the player to hide the movie clip containing the cloud and displaying a different movie clip of a cloud raining on the man displayed above the animation or image of the man if the user moves the pointing device to the upper ⅓ of the window in which the movie is displayed, but hiding such image and displaying the non-raining cloud image as described above if the user moves the pointing device back into the lower ⅔ of the window in which the movie is displayed.

In another example, the author may wish to give the appearance of movement in 3D space, with the cursor appearing to move farther from the user as the cursor is moved upward in the window. The author would then provide instructions to instruction receiver 228 that uses the mouse's y position to set the image scale so that the image becomes smaller as _root._ymouse decreases. More specifically, one formula to calculate image scale s given window height h and cursor vertical position y could be s=2*(1−_root._ymouse/h).

Although one or more attributes of an image animation cursor change with the position of the pointing device, in one embodiment, other attributes of an image/animation cursor do not change with the position of the pointing device. For example, the author may wish to have the image/animation cursor shrink and grow at regular intervals in the cursor animation. The author would issue instructions to instruction receiver 228 to increase the scale every n frames, and to decrease the scale every n frames, where n is the author's chosen interval in the animation timeline.

To switch back to the conventional cursor, the author issues an instruction through user input communication interface 210 to hide the image/animation cursor. User input communication interface 210 transmits the instruction to hide the image/animation cursor to cursor hide instruction receiver 224, which stores the instruction in instruction storage 226. The author then issues an instruction through user input communication interface 210 to restore the conventional cursor. User input communication interface 210 transmits the restore command to cursor hide instruction receiver 224, which writes the corresponding commands to restore the conventional cursor to instruction storage 226.

When the author wishes to package the animation so that it can be placed on server 250, the author issues a command through user input communication interface 210 which is transmitted to instruction/image/animation compiler 230. Instruction/image/animation compiler 230 reads instructions from instruction storage 226, and images and animations from image/animation storage 222, and processes these instructions, images and animations, writing the results to instruction storage 226. In one embodiment, the processing includes compiling the instructions. In another embodiment, processing includes compressing the instructions, images and animations. In one embodiment, the result of the processing is a conventional .swf file for use in the Flash Player, commercially available from Macromedia, Incorporated of San Francisco, Calif. The format of .swf files are described at http://www.macromedia.com/software/flash/open/licensing/fileformat/ which is hereby incorporated by reference in its entirety. Instruction/image/animation compiler 230 sends packaged screen content from the authoring environment 206 to server 250 via communication interface 240. Authoring environment 206 communicates with server 250 via communication interface 240 that is coupled to a network such as the Internet, or to a local area network. Communication interface 240 is a conventional communication interface that supports TCP/IP or other conventional communication protocols.

All communication made by server 250 is through communication interface 252 which is coupled to a network such as the Internet, or to a local area network, or both. Communication interface 252 is conventional communication interface that supports TCP/IP or other conventional communication protocols.

Packaged screen content is received from the authoring environment 206 via communication interface 252 of server 250. Communication interface 252 provides the screen content containing image/animation cursor instructions, images and animations to instruction/image/animation storage system 254, which stores the screen content. Display environment 260 sends requests for screen content animations to server 250, as will be described in more detail below. When communication interface 252 receives a request for screen content, it sends the request to server request handler 256.

Server request handler 256 locates the requested screen content in instruction/image/animation/storage system 254. Server request handler transmits the located screen content to communications interface 252, providing instructions to hide the cursor, providing instructions described above including instructions to position or change an attribute of an image/animation cursor in response to a position of a mouse or other pointing device, and instructions to antialias or scale or both the image/animation cursor. Server request handler 256 also transmits the images and animations which make up the image/animation cursor stored in instruction/image/animation storage system 254.

Display environment 260 sends and receives communication through communication interface 262, which is coupled to a network such as the Internet, or to a local area network, or both. Communication interface 262 is conventional communication interface that supports TCP/IP or other conventional communication protocols. Display environment 260 includes a keyboard 282 and mouse (not shown) or other conventional input device.

A user views screen content on display environment 260. In one embodiment, the screen content is viewed through a window displaying a web browser. The user provides input to the screen content through a mouse (not shown), keyboard 282, or similar input device. Mouse and keyboard inputs are sent to operating system/browser 276 that generates corresponding events, which are sent to image/animation commander 272. An example of an event is a mouse down at window position (124, 345).

When the user asks to display screen content containing an image/animation cursor, for example by entering the address of a web page into a browser, or by following a link to a web page, operating system/browser 276 transmits the request to request handler 266. Request handler 266 generates a request for the screen content, which it transmits to communication interface 262, which transmits the request to server 250. Server 250 provides the screen content, as described above, to communication interface 262, which transmits the received screen content to request handler 266, which places the screen content instructions, images and animations in instruction/image/animation storage system 264. Image/animation commander 272 reads the instructions in instruction/image/animation storage 264. When image/animation commander 272 encounters a command to hide the conventional cursor, it sends a signal to cursor hider 270. Cursor hider 270 contains operating system specific instructions for handling the cursor. When cursor hider 270 receives the signal to hide the conventional cursor, it finds the appropriate command that will cause operating system/browser 276 to hide the mouse cursor, and sends that command to operating system/browser 276. In one embodiment, the operating system is Microsoft Windows 98, and the command to hide the conventional cursor is "ShowCursor(False)". In one embodiment, the command causes operating system to suppress the display of the system cursor. In another embodiment, the command replaces the system cursor with a transparent image.

Image/animation commander 272 uses the mouse position received from operating system/browser 276 to execute cursor instructions in instruction/image/animation storage 264 to determine attributes such as the position, scale and antialiasing of the image/animation cursor. In particular, the position of the image/animation cursor relative to the mouse position is calculated according to the author's instructions. For example, image/animation commander 272 replaces position variables in the instructions with current mouse position coordinates, and calculates the resulting position, and transmits the position to renderer 274. Similarly, image/animation commander 272 calculates the scale value and the antialiasing value, optionally using mouse position and state from operating system/browser 276, and transmits these values to renderer 274. Image/animation commander 272 also transmits the cursor image or animation, from instruction/image/animation storage 264, to renderer 274.

Renderer 274 sends rendering instructions to render the image/animation cursor, of the indicated size and position, to operating system/browser 276. In one embodiment, renderer 274 creates a web page which can be displayed by operating system/browser 276. In another embodiment, renderer 274 provides commands to operating system/browser 276 as a plug in for the browser. In such embodiment, some or all of renderer 274, image/animation commander 272, and cursor hider 270 are included as part of an application program such as the conventional Flash 5 Player program commercially available from Macromedia, Inc. of San Francisco, Calif. In another embodiment, renderer 274 creates rendering instructions for an ActiveX plug-in running in operating system/browser 276. Operating system/browser 276, which may contain a graphics card, renders the image/animation cursor on display 280.

If image/animation commander 272 encounters a command to restore the image/animation cursor and to restore the conventional cursor, it sends a signal to cursor hider 270. When cursor hider 270 receives the signal to restore the conventional cursor, it finds the appropriate command that will cause operating system/browser 276 to restore the cursor, either through a command or by replacing the bitmap designated for the cursor from an empty bitmap to the original bitmap, and sends that command to operating system/browser 276. In one embodiment, the operating system is Microsoft Windows 98, and the command to restore the conventional cursor is "ShowCursor(True)".

In one embodiment, cursor animations are streamed from server 250 to display environment 260. In this embodiment, instruction/animation storage 264 optionally buffers part of the animation, and image/animation commander 272 begins executing the instruction in instruction/animation storage 264 before all of the instruction and images which make up the image/animation cursor are received. In one embodiment, request handler 266 signals command interface 262 when there is room in instruction/animation storage 264 or periodically, and communication interface 262 then requests more data from server 250.

In one embodiment, authoring environment 206, server 250, and display environment 260 reside on the same computer. In this embodiment, communication interfaces 240, 252 and 262 are file transfers within a local file system.

Figures 3A, 3B:
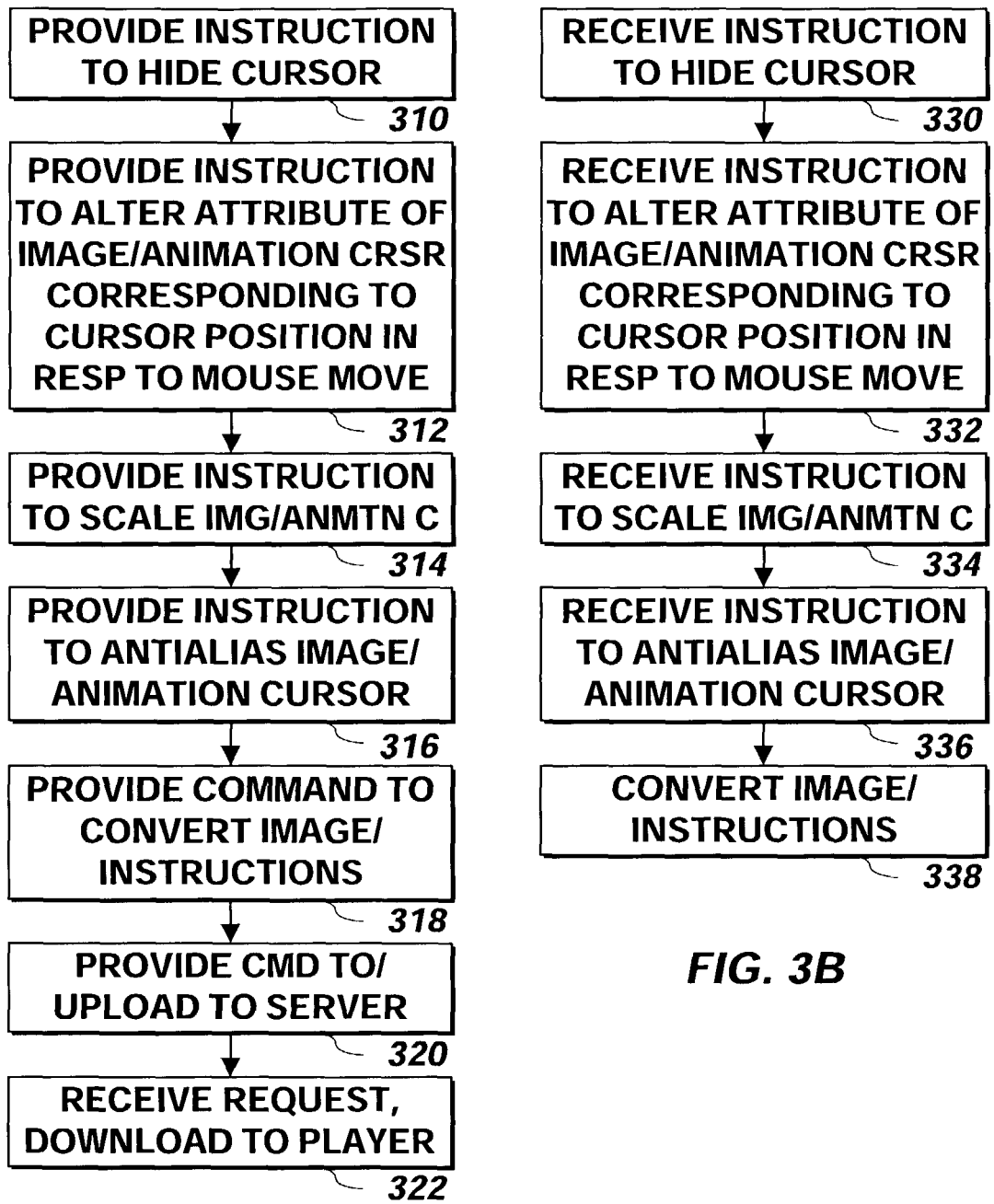
FIG. 3A is a flowchart illustrating a method of providing instructions to display an alternate cursor corresponding to one or more locations of a mouse cursor according to one embodiment of the present invention.
FIG. 3B is a flowchart illustrating a method of receiving, and optionally converting, instructions to display an alternate cursor corresponding to one or more locations of a mouse cursor according to one embodiment of the present invention.

Referring to FIG. 3A, a method for providing an image/animation cursor, which May be a vector based image or any form of animation as described above. An instruction is provided 310 to hide the conventional bitmap mouse cursor. An instruction is provided 312 to position the image/animation cursor or otherwise change at least one attribute of an image/animation cursor relative to the mouse position when a mouse event, such as a mouse move, occurs 312. An instruction is provided to scale the image/animation cursor 314, optionally using the mouse position and state or the animation frame count, to determine the scale factor, as described above. An instruction may be provided to apply antialiasing 316 to the images used in the image/animation cursor. A command is provided to convert the images and instructions 318, possibly compiling and/or compressing them as described above. The converted images and instructions are uploaded to the server 320 and then, when requested by a user, are downloaded to the player 322 for display to the user.

Referring to FIG. 3B, a method for receiving an animation cursor is shown according to one embodiment of the present invention. An instruction is received to hide the conventional bitmap cursor 330. An instruction is received to position or otherwise adjust one or more attributes of the image/animation cursor relative to the mouse position when a mouse event occurs 332. An instruction is then received to scale the image/animation cursor 334, optionally using the mouse position and state or the animation frame count, to determine the scale factor, as described above. An instruction may be provided to apply antialiasing 336 to the images used in the image/animation cursor. A command is received to convert the images and instructions 338, possibly compiling and/or compressing them.

Figure 3C:
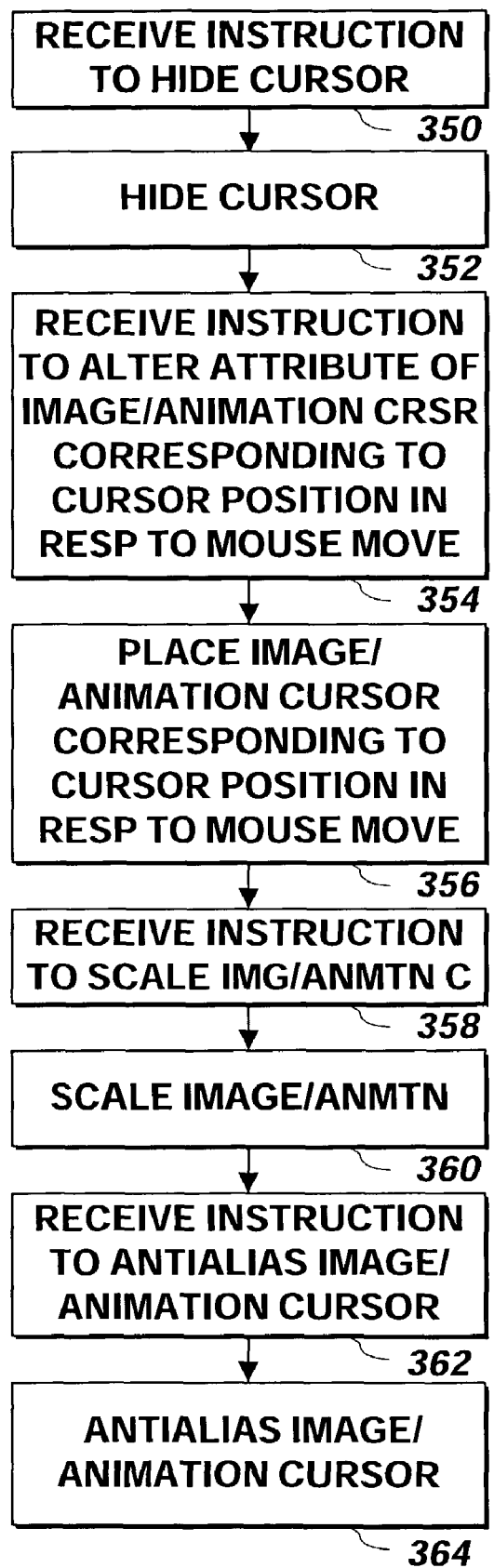
FIG. 3C is a flowchart illustrating a method of executing instructions to display an alternate cursor corresponding to one or more locations of a mouse cursor according to one embodiment of the present invention.

Referring now to FIG. 3C, a method of displaying an image/animation cursor is shown according to one embodiment of the present invention. An instruction is received to hide the conventional bitmap cursor 350, and system commands are generated and executed to hide the bitmap cursor 352. One or more instructions are received to position or otherwise change one or more attributes of the image/animation cursor relative to the mouse position when a mouse, event occurs 354, and the image animation is placed 356 at the position received. An instruction is received to scale the image/animation cursor by an indicated amount 358, and the image/animation cursor is scaled by the indicated amount 360 using conventional scaling of vector images techniques. An instruction is received to antialias images which make up the image/animation cursor 362 and the image/animation cursor image or images are antialiased 364 using conventional antialias techniques.

What is claimed is:

1. A computer-implemented method, comprising:
receiving data, the data including multi-media content;
playing at least a portion of the multi-media content; and
configuring a cursor to display at least a portion of the multi-media content responsive to the playing.

2. The method of 1 wherein the receiving comprises reading the data from a file.

3. The method of 1 wherein the receiving is performed over a network.

4. The method of 1, further comprising:
modifying the cursor responsive to user interaction.

5. The method of 1, further comprising:
modifying the cursor responsive to the multi-media content.

6. The method of 1, wherein the data includes cursor modification instructions.

7. The method of 6, further comprising:
processing the cursor modification instructions responsive to the playing; and
modifying the cursor in accordance with the instructions.

8. The method of 1 wherein the configuring comprises enabling information exchange between the at least a portion of the multi-media content being played and the at least a portion of the multi-media content displayed by the cursor.

9. A computer program product comprising a computer useable medium having computer readable program code embodied therein, the computer program product comprising computer readable program code devices configured to cause a computer system to:
receive data, the data including multi-media content;
play at least a portion of the multi-media content; and
configure a cursor to display at least a portion of the multi-media content responsive to the playing.

10. The computer program product of claim 9, the computer readable program code devices configured to cause the computer system to receive comprise computer readable program code devices configured to read the data from a file.

11. The computer program product of claim 9, wherein the data is received over a network.

12. The computer program product of claim 9, the computer readable program code devices further configured to cause the computer system to modify the cursor responsive to user interaction.

13. The computer program product of claim 9, the computer readable program code devices further configured to cause the computer system to modify the cursor responsive to the multi-media content.

14. The computer program product of claim 9, wherein the data includes cursor modification instructions.

15. The computer program product of claim 14, the computer readable program code devices configured to cause the computer system to:
process the cursor modification instructions responsive to the playing; and
modifying the cursor in accordance with the instructions.

16. The computer program product of claim 9, the computer readable program code devices configured to cause the computer system to configure comprise computer readable program code devices configured to enable information exchange between the at least a portion of the multi-media content being played and the at least a portion of the multi-media content displayed by the cursor.

17. A system, comprising:
a processor; and
a computer readable storage medium coupled with the processor and effecting:
a content receiver to receive data, the data including multi-media content; and
an instruction receiver comprising instructions to:
play at least a portion of the multi-media content, and
configure a cursor to display at least a portion of the multi-media content responsive to the playing.

18. The system of claim 17, wherein the content receiver reads the data from a file.

19. The system of claim 17, wherein the content receiver receives data over a network.

20. The system of claim 17, the instruction receiver further comprising instructions to modify the cursor responsive to user interaction.

21. The system of claim 17, the instruction receiver further comprising instructions to modify the cursor responsive to the multi-media content.

22. The system of claim 17, the data includes cursor modification instructions.

23. The system of claim 22, the instruction receiver further comprising instructions to:
process the cursor modification instructions responsive to the playing; and
modify the cursor in accordance with the instructions.

24. The system of claim 17, wherein the instruction receiver instructions to configure the cursor further comprise instructions to enable information exchange between the at least a portion of the multi-media content being played and the at least a portion of the multi-media content displayed by the cursor.

* * * * *

UNITED STATES PATENT AND TRADEMARK OFFICE
CERTIFICATE OF CORRECTION

PATENT NO.       : 8,171,430 B1
APPLICATION NO.  : 10/201729
DATED            : May 1, 2012
INVENTOR(S)      : Slavik Lozben and Gary Grossman It is certified that error appears in the above-identified patent and that said Letters Patent is hereby corrected as shown below:

Column 11, line 38 (line 1 of claim 2) of the printed patent, delete "1" and insert -- claim 1 --.

Column 11, line 40 (line 1 of claim 3) of the printed patent, delete "1" and insert -- claim 1 --.

Column 11, line 42 (line 1 of claim 4) of the printed patent, delete "1" and insert -- claim 1 --.

Column 11, line 44 (line 1 of claim 5) of the printed patent, delete "1" and insert -- claim 1 --.

Column 11, line 47 (line 1 of claim 6) of the printed patent, delete "1" and insert -- claim 1 --.

Column 11, line 49 (line 1 of claim 7) of the printed patent, delete "6" and insert -- claim 6 --.

Column 11, line 53 (line 1 of claim 8) of the printed patent, delete "1" and insert -- claim 1 --.

Column 12, line 50 (line 1 of claim 22) of the printed patent, delete "the" and insert -- wherein the --.

Signed and Sealed this
Thirty-first Day of July, 2012

David J. Kappos
*Director of the United States Patent and Trademark Office*